INVENTER
D. KOEHLER
BY R. B. Ardis
ATTORNEY

United States Patent Office 3,452,284

Patented June 24, 1969

3,452,284

PULSE DISTRIBUTOR COMPRISING $n-1$ COUNTERS AND $n-1$ SUBTRACTION MEANS HAVING SCALES STARTING WITH $n$ AND DECREASING IN UNITARY STEPS, $n$ BEING GREATER THAN 2

Dankwart Koehler, New Providence, N.J., assignor to Bell Telephone Laboratories, Incorporated, Murray Hill and Berkeley Heights, N.J., a corporation of New York Filed Aug. 3, 1966, Ser. No. 570,038
Int. Cl. H03k *17/02*
U.S. Cl. 328—105 12 Claims This invention relates to sequential pulse distributing circuits and, more specifically, to nonperiodic sequential pulse distributors using nonfrequency sensitive counters and subtraction circuits as basic building blocks.

Sequential pulse distributing circuits must be capable of transforming nonperiodic serial pulse trains into a desired number of sequential paralleled outputs. Only one output pulse must be present at the output of the pulse distributor at any one time, where a specific output pulse corresponds to one particular input pulse of the serial pulse train.

In some applications ring counters have been used to perform such sequential pulse distribution. Although ring counters can readily accomplish these basic functions in low and medium high pulse rate applications, complex problems arise in their application to the high pulse rates required, for instance, in some of today's sophisticated high speed pulse code modulation systems, high speed computers, or nuclear detection systems. Two of the principal problems arising in connection with the high speed applications of ring counters have been the occurrence of more than one output pulse at any one time and that of obtaining satisfactory wrong-mode rejection, that is, the prevention of output pulses occurring in the wrong sequence. Complex circuitry has been required to attempt the adaptation of such ring counters to satisfy these requirements, resulting at the most in marginal, unreliable counter operation. Further complications arise when the applied pulses are nonperiodic; that is, the ring counter or sequential pulse distributor must be able to cope with phase variations in addition to the ultrafast response time requirements.

The primary object of the present invention is to increase the reliability and performance characteristics of sequential pulse distributors.

Another object of the invention is to render sequential pulse distributors insensitive to phase variations of the input pulse train.

A further object of the invention is to provide for sequential pulse distributors that are particularly adapted to operate efficiently and reliably at high pulse repetition rates.

Still another object of the invention is to improve the wrong-mode rejection of sequential pulse distributors.

The invention accomplishes these objects using a plurality of counters and a like number of subtraction circuits as the basic elements of a sequential pulse distributor. In accordance with the invention, a sequential pulse distributor supplying $n$ outputs is made up of $n-1$ successive counters having respective scales beginning with $n$ for the first and decreasing in unitary steps to 2 for the last, where $n$ is a positive integer greater than 2, and $n-1$ subtraction circuits. The outputs of all preceding counters are subtracted from the input pulse train and the resulting difference is applied to each counter in succession. The first $n-1$ outputs are taken from the respective counters and the last is taken from the final subtraction circuit.

In one advantageous embodiment of the invention, the input pulse train is applied to drive the first counter, the output of the first counter is subtracted from the input pulse train and the difference applied to drive the second counter, the output of the second counter is subtracted from the input of the second counter and the difference applied to drive the third counter, and so on. In each stage the output from the counter is, in other words, subtracted directly from the input to that same counter.

In another advantageous embodiment, the input pulse train is applied to drive the first counter, the output of the first counter is subtracted from the input pulse train and the difference applied to drive the second counter, the outputs of the first and second counters are both subtracted from the input pulse train and the difference applied to drive the third counter, and so on. In each stage, in other words, the output from the counter and the output from all preceding counters are subtracted together from the input pulse train itself.

The above and other features of the invention will be more fully understood from the following detailed description considered in conjunction with the drawings in which.

Figure 1:
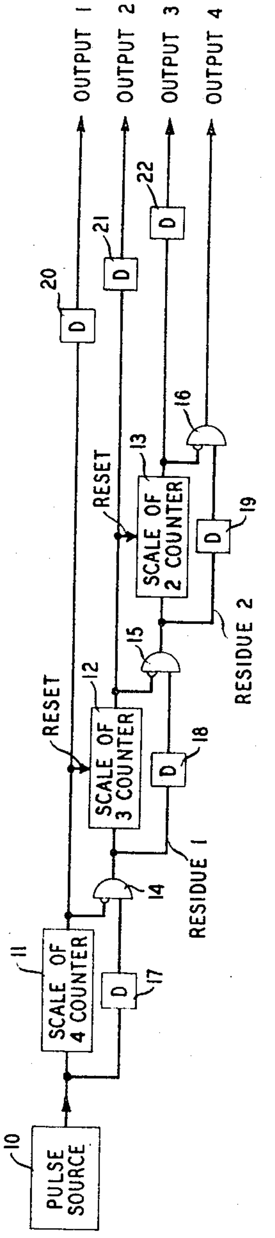
FIG. 1 is a block diagram of one specific embodiment of the invention in which the pulse input to each succeeding counter is the difference between the pulse input and output of a preceding counter.

In FIG. 1 a block diagram of a sequential pulse distributor is shown comprising a pulse source 10, counters 11, 12, and 13, inhibit gates 14, 15, and 16, and delay units 17 through 22. Pulse source 10 furnishes a nonperiodic serial pulse train of the type, for instance, as shown in row A of FIG. 2. The pulses of the pulse train are individually and sequentially distributed to the four outputs of the sequential pulse distributor, thereby generating at each output pulse groups consisting of specific corresponding pulse train pulses. That is, the pulse group of output #1, for instance, consists of every fourth pulse train pulse designated pulse #1 as shown in row B of FIG. 2; similarly the pulse groups of outputs #2, #3, and #4 consists of the pulses as shown in rows D, F, and G, respectively, of FIG. 2.

Figure 2:
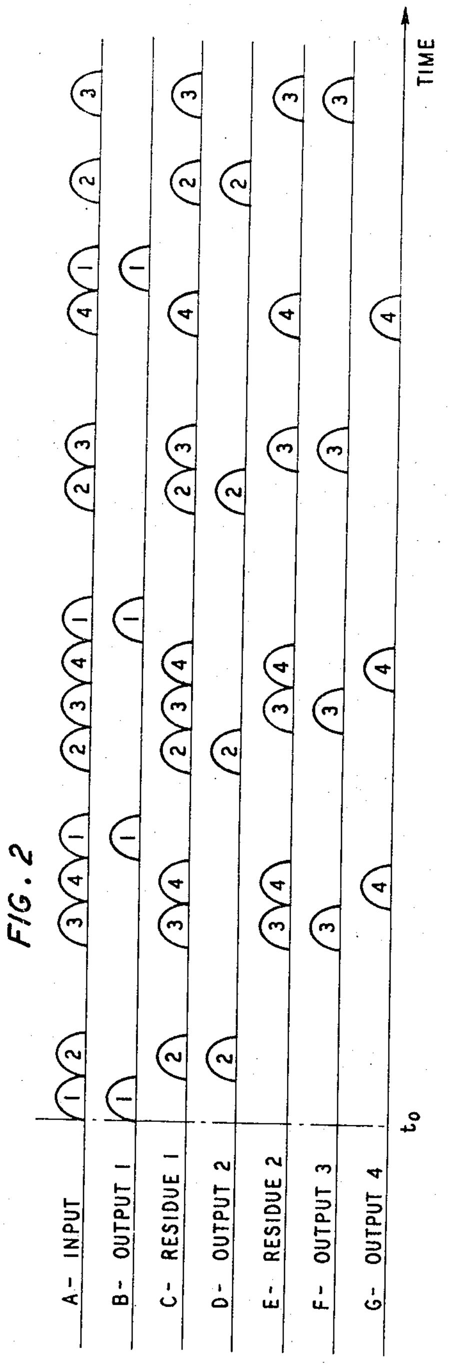
FIG. 2 shows waveforms to illustrate the operation of the embodiment of the invention of FIG. 1.

In the sequential pulse distributor of FIG. 1 pulse source 10 applies its nonperiodic pulse train output to counter 11. The counter, in turn, performs a divided-by-$n$ function on the input pulse train. Since the embodiment of the invention of FIG. 1 provides for four outputs, i.e., $n$ is equal to four, counter 11 divides by four. The counter therefore presents at its output every fourth of its input pulses as shown in row B of FIG. 2; that is, only every fourth pulse of the input pulse train, designated as pulse #1 in FIG. 2, is being furnished at the output of counter 11. This group of #1 pulses is further applied through delay unit 20 to output #1 of the sequential pulse distributor to be available as the group of #1 output pulses derived from the input pulse train. Delay unit 20 compensates for the difference in delay between pulses at output #1 and output #4 due to the inherent delays associated with the additional counters and inhibit gates that are in the path of output #4 pulses.

The output of counter 11, in addition to being applied as reset pulses to counter 12, is used as inhibit input for inhibit gate 14. The main input to inhibit gate 14, derived from pulse source 10, is delayed in delay unit 17 a time interval equal to the inherent delay time of counter 11 to maintain the proper timing relationship between the two inputs to inhibit gate 14. The inhibit input to inhibit gate 14, consisting of the #1 pulses of the input pulse train, inhibits gate 14 at the occurrence of each one of the #1 pulses, thereby generating at the output of inhibit gate 14 a residue 1 of pulses, consisting of groups of the #2, #3, and #4 pulses, as shown in row C of FIG. 2. That is, inhibit gate 14 subtracts pulse #1 from the pulse train shown in row A of FIG. 2. This group of residue 1 pulses is applied to counter 12, which performs a divide-by-three operation, thereby selecting every #2 pulse of the input pulse train as shown in row D of FIG. 2. These selected #2 pulses are applied through delay unit 21 to output #2 of the ring counter, to form the group of #2 output pulses derived from the input pulse train. Delay unit 21 compensates for the difference in delay between pulses at output #2 and output #4 due to the inherent delays associated with the additional counter and inhibit gates that are in the path of output #4 pulses. The output of counter 12 is also used to reset counter 13.

The output of inhibit gate 14, namely residue 1, is also applied through delay unit 18 as main input to inhibit gate 15, and the output of counter 12, namely pulses #2, is also used as the inhibit input to inhibit gate 15. Delay unit 18 compensates for the delay of the inhibit input caused by the inherent delay of counter 12. The two inputs to inhibit gate 15 cooperate to produce the residue 2 output consisting of pulse groups of pulses #3 and #4 as shown in row E of FIG. 2. Residue 2 is generated by the subtraction of the #2 pulses of row D from the group of #2, #3, and #4 main input pulses of row C of FIG. 2. The output of inhibit gate 15 is next applied to counter 13 to be divided by two, with a resultant output of #3 pulses as shown in row F of FIG. 2. The #3 pulses of the input pulse train are furnished from counter 13 through delay unit 22 to output #3 of the sequential pulse distributor, to form the group of #3 output pulses. Delay unit 22 inserts a sufficient delay into the path of the third group of pulses to compensate for the additional delay of the output #4 pulses as caused by inhibit gate 16.

The fourth group of output pulses is furnished to output #4 of the ring counter from the output of inhibit gate 16. Output #4, shown in row G of FIG. 2, consists of every #4 pulse of the input pulse train. This group of #4 pulses is obtained by subtracting in inhibit gate 16 the #3 pulses shown in row F of FIG. 2, namely the output of counter 13, from the #3 and #4 pulse groups of row E of FIG. 2, the output of inhibit gate 15. Delay unit 19 functions to compensate for the difference in delay between main input and inhibit input to inhibit gate 16 as caused by counter 13.

In the embodiment of the invention of FIG. 1, the reset pulses for the counters have been shown to be obtained from a respective immediately preceding counter. An alternate method of resetting would be to use the output of counter 11 to reset all following counters.

The invention provides, therefore, for a relatively simple sequential pulse distributor that is particularly useful in high speed applications, since it provides for a simple resetting method to exclude wrong modes and does neither employ complex ring counters nor is sensitive to phase variations of the input pulse train. The successive counting and resetting and subtracting by the counters and inhibit gates, respectively, ensures that the pulse distributor output pulses will at all times be generated in the proper sequence, one pulse at a time.

Figure 3:
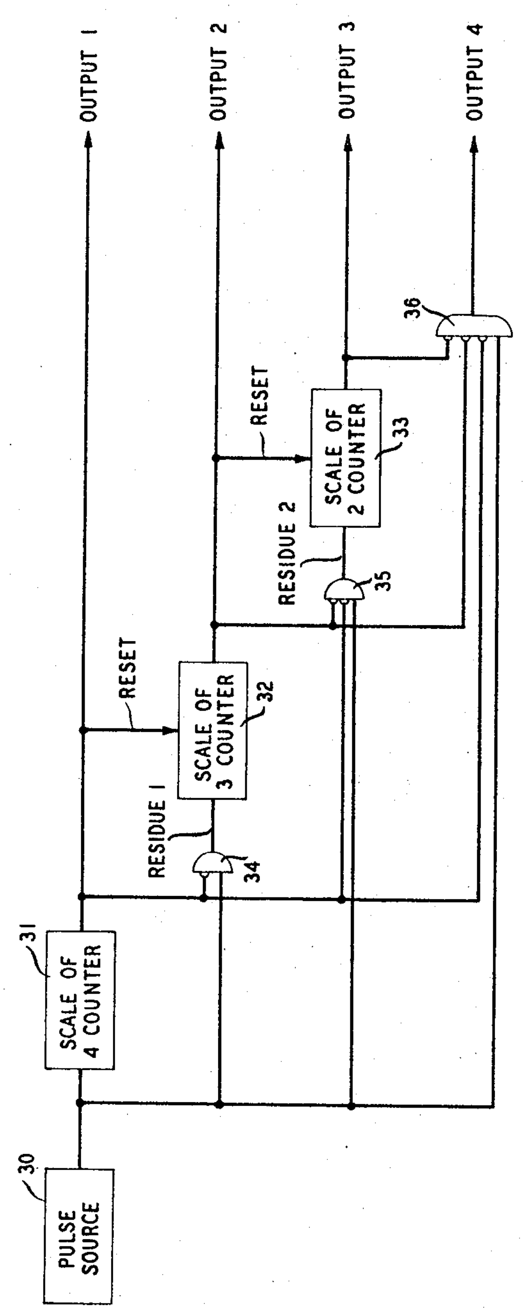
FIG. 3 is a block diagram of another embodiment of the invention in which the pulse input to each succeeding counter is the difference between a preceding counter pulse output and the entire pulse train input.

Another embodiment of the invention comprising a pulse source 30, counters 31 through 33, and inhibit gates 34 through 36 is illustrated in the simplified block diagram of FIG. 3. The same number of counters and inhibit gates that are required for the embodiment of FIG. 1 are necessary for the four output pulse distributor illustrated in FIG. 3. However, the main input to each inhibit gate of the sequential pulse distributor shown in FIG. 3 consists of the entire pulse train output of pulse source 30, while respective inhibit inputs of specific inhibit gates consist of the outputs of all preceding counters. Delay units, which may be required in specific output and input lines for high speed circuit operation as described with reference to the embodiment of FIG. 1, have not been shown in FIG. 2 in order to illustrate the basic concept of the invention more clearly.

In the embodiment of the invention of FIG. 3, pulse source 30, counters 31, 32, and 33, and inhibit gate 34 perform the identical functions and receive the identical inputs as pulse source 10, counters 11, 12, and 13, and inhibit gate 14 of the embodiment of the invention of FIG. 1. Inhibit gates 35 and 36 perform their subtraction function, however, in a different manner than the corresponding inhibit gates 15 and 16 of FIG. 1. That is, inhibit gates 35 and 36 receive as their main input the entire pulse train output of pulse source 30 as shown in row A of FIG. 2. In order for inhibit gate 35 to provide for a residue 2 output, as shown in row E of FIG. 2 and consisting of #3 and #4 pulses, the #1 and #2 pulses must be subtracted from the overall pulse train. This subtraction is accomplished by applying to inhibit gate 35 two separate inhibit inputs, namely, the output of counter 31 consisting of the #1 pulses and the output of counter 32 consisting of the #2 pulses, and subtracting these pulses from the main input. Inhibit gate 36, on the other hand, while also having the entire pulse train as its main input, has three separate inhibit inputs to subtract the #1, #2, and #3 pulses in order to have only #4 pulses at its output. The three required inhibit inputs for inhibit gate 36 are obtained from the respective preceding counter outputs. The reset pulses for counters 32 and 33 are each obtained from a respective immediately preceding counter.

Delay units may be added in specific circuit paths to compensate for differences in propagation time between these respective paths, where such delays are caused by the inherent delay times associated with particular circuit elements and the difference in the number of circuit elements used in respective paths in a similar manner as described in conjunction with the previously described embodiment of the invention. It is to be understood that the inclusion of delay units is only necessary in very high speed systems, where the inherent delays introduced by the counters or inhibit gates are significant with respect to the pulse rate or pulse width. Delay units which may be used in the embodiment of the invention are well known in the art and may, for instance, be of the type as generally described in chapter 10 of Millman & Taub, Pulse and Digital Circuits, McGraw-Hill, 1956. The same reference, chapter 11, includes a general description of counter circuits which may be used in the embodiment of the present invention. In order to adapt the invention to high speed pulse systems the gates and counter circuits must be designed to include the required high speed capabilities, which designs are well known to the art today, as evidenced by the article "Tunnel Diode Digital Circuitry," by W. F. Chow, IRE Transactions on Electronic Computers, September 1960, pp. 295–301.

It is to be understood that the above-described arrangements are illustrative of the application of the principles of the invention. Numerous other arrangements may be devised by those skilled in the art without departing from the spirit and scope of the invention.

What is claimed is:

1. A pulse distributor for distributing incoming pulses sequentially to a plurality of $n$ different outputs, where $n$ is a positive integer greater than 2, said distributor comprising a plurality of $(n-1)$ counters, successive ones of said counters having respective scales beginning with $n$ for the first and decreasing in unitary steps to 2 for the last, means to subtract the outputs of all preceding ones of said counters from the input pulse train in respective ones of said subtraction circuits and apply the resulting difference to drive each of said counters in succession, and output means connected to each of said counters and the last of said subtraction circuits.

2. A pulse distributor for distributing incoming pulses sequentially to a plurality of outputs comprising a plurality of counters, an equal number of subtracting circuits, a first one of said counters having a divisor scale equal to the total number of said outputs and succeeding ones of said counters having scales decreasing in unitary steps, means to supply an input train of pulses to said first counter, each succeeding one of said counters receiving its input from a respective preceding subtracting circuit, each of said counters furnishing its output individually to a respective one of said plurality of outputs, said one remaining subtracting circuit furnishing its output directly to the remaining one of said plurality of outputs, and means to connect said input pulses to respective succeeding subtracting circuits, whereby the input train of pulses is sequentially distributed to said plurality of outputs.

3. A pulse distributor for distributing incoming pulses sequentially to a plurality of $n$ different outputs which comprises a plurality of $n-1$ counters, where $n$ is a positive integer greater than 2, and a plurality of $n-1$ subtracting circuits to subtract one set of input pulses from another set of input pulses to said subtracting circuits, the first of said counters having a divisor scale of $n$ and succeeding ones of said counters having scales descending in unitary steps from $n-1$ to 2, means to supply an input train of pulses to said first counter and a first subtracting circuit, said first subtracting circuit subtracting the output of said first counter from the input train of pulses to create a first residue, each of the remaining subtracting circuits individually subtracting the output of each remaining counter from a previous residue to create a respective new residue, respective succeeding counters having as their input a respective preceding residue, $n$ distribution outputs each individually connected to the output of a respective one of said counters and one of said outputs being connected directly to the last residue.

4. The sequential pulse distributor according to claim 3 in which said subtraction circuits comprise inhibit gates and in which a first one of said inhibit gates has as its primary input said input pulse train and as its inhibit input the output of said first counter, and in which each succeeding one of said plurality of inhibit gates receives its primary input from a respective preceding inhibit gate output and its inhibit input from a respective preceding counter output.

5. The sequential pulse distributor according to claim 3 which in addition includes a plurality of delay units, one each of said delay units being connected between a respective one of said counter outputs and a respective distributor output, whereby said delay units compensate for the difference in propagation delay of the output pulses due to the difference in the number of counters and inhibit gates in respective pulse paths, and one each of said remaining delay units being connected in the primary input line of each one of said inhibit gates, said delay units delaying said primary input pulses a time interval substantially equal to the time interval said respective inhibit inputs are being delayed through a respective counter.

6. The sequential pulse distributor according to claim 5 in which in addition the output of said first counter is connected to the reset input of each of the succeeding counters, whereby said output resets said respective succeeding counter.

7. The sequential pulse distributor according to claim 5 in which in addition the output of a respective preceding counter is connected to the reset input of a respective succeeding counter, whereby said respective outputs reset said respective succeeding counters.

8. A pulse distributor for distributing incoming pulses sequentially to a plurality of $n$ different outputs which comprises a plurality of $n-1$ counters, where $n$ is a positive integer greater than 2, and a plurality of $n-1$ subtracting circuits to subtract one set of input pulses from another set of input pulses to said subtracting circuits, the first of said counters having a divisor scale of $n$ and succeeding ones of said counters having scales descending in unitary steps from $n-1$ to 2, means to supply an input train of pulses to said first counter and to all of said subtracting circuits, said first subtracting means subtracting the output of said first counter from the input train of pulses to create a first residue, each of said remaining subtracting circuits subtracting the sum of all preceding counter outputs from said input pulse train to create a respective new residue, each of said succeeding counters having as their input the residue output of a respective preceding subtracting circuit, and $n$ distribution outputs each individually connected to the output of a respective one of said counters and one of said outputs being connected directly to the last residue.

9. The sequential pulse distributor according to claim 8 in which said subtraction circuits comprise inhibit gates and in which each of said inhibit gates has as its primary input said input pulse train, and in which each of said inhibit gates has one individual inhibit input from each one of the respective preceding counter outputs, whereby the number of inhibit inputs to respective inhibit gates corresponds to the number of respective preceding counters.

10. The sequential pulse distributor according to claim 9 which in addition includes a plurality of delay units, one each of said delay units being connected between a respective one of said counter outputs and distributor outputs, whereby said delay units compensate for a difference in propagation delay between pulses of a respective output and the propagation delay of the output pulses of said last inhibit gate due to the difference of the number of counters and inhibit gates in the respective pulse path, one each of said plurality of delay units connected in each of said inhibit input lines of respective inhibit gates except those inhibit input lines from the next preceding counter, and one each of said remaining delay units being connected in the primary input line of each one of said inhibit gates, said delay units delaying said primary input pulses a time interval substantially equal to the time interval said respective inhibit gate inhibit inputs are delayed through respective preceding counters and inhibit gates.

11. The sequential pulse distributor according to claim 10 in which in addition the output of said first counter is connected to the reset input of each of the succeeding counters, whereby said output resets said respective succeeding counters.

12. The sequential pulse distributor according to claim 10 in which in addition the output of a respective preceding counter is connected to the reset input of a respective succeeding counter, whereby said respective outputs reset said respective succeeding counters.

References Cited

UNITED STATES PATENTS

| | | | |
|---|---|---|---|
| 2,557,086 | 6/1951 | Fisk et al. | 328—105 |
| 2,620,440 | 12/1952 | Baker et al. | 328—43 |

JOHN S. HEYMAN, *Primary Examiner.*

B. P. DAVIS, *Assistant Examiner.*

U.S. Cl. X.R.

328—43